(12) United States Patent
Dawson

(10) Patent No.: US 7,414,378 B2
(45) Date of Patent: Aug. 19, 2008

(54) HIGH PRECISION POSITIONING POWERED TURNTABLE AND CONTROL METHOD THEREOF

(75) Inventor: Shawn Dawson, Bowmanville (CA)

(73) Assignee: Sailrail Automated Systems, Inc., Markham (CA)

( * ) Notice: Subject to any disclaimer, the term of this patent is extended or adjusted under 35 U.S.C. 154(b) by 80 days.

(21) Appl. No.: 11/566,972

(22) Filed: Dec. 5, 2006

(65) Prior Publication Data
US 2008/0094014 A1    Apr. 24, 2008

(30) Foreign Application Priority Data
Dec. 5, 2005  (CA)  .................................... 2528892

(51) Int. Cl.
*G05B 11/01*  (2006.01)
*B60S 13/02*  (2006.01)

(52) U.S. Cl. .................... 318/560; 318/12; 318/265; 318/567; 104/35

(58) Field of Classification Search ............. 318/12, 318/15, 560, 565, 567, 568
See application file for complete search history.

(56) References Cited

U.S. PATENT DOCUMENTS

| | | | |
|---|---|---|---|
| 4,216,870 A | 8/1980 | Bonneson et al. | |
| 4,750,428 A | 6/1988 | Hyte et al. | |
| 5,086,704 A | 2/1992 | Mueller | |
| 5,609,061 A | 3/1997 | Moller | |
| 5,755,160 A | 5/1998 | Blufordcraving | |
| 6,470,807 B2 * | 10/2002 | Warner | 104/35 |
| 6,672,221 B2 * | 1/2004 | Hadley | 104/35 |
| 6,745,699 B2 * | 6/2004 | Hill | 104/35 |
| 6,843,459 B2 | 1/2005 | Muchalov | |
| 6,977,477 B2 * | 12/2005 | Bloyer et al. | 318/560 |
| 7,151,352 B2 * | 12/2006 | Ohashi et al. | 318/560 |
| 7,154,243 B2 * | 12/2006 | Weiss | 318/560 |

* cited by examiner

*Primary Examiner*—Long Nguyen
*Assistant Examiner*—Thai T Dinh
(74) *Attorney, Agent, or Firm*—Nelligan O'Brien Payne LLP; Wing T. Yan

(57) ABSTRACT

The invention relates to the field of material handling or logistic equipment in particular, relates to turntables, which can be used especially for automation of production line, assembly assistance, line feeding and synchronous manufacturing. A high precision positioning powered turntable and its controlling method are disclosed herewithin, based on slewing ring bearing having an integral gear on the inner ring, and positively driven by a gear motor. A plurality of sensors and sensor flags are installed for monitoring position of the turntable top structure for controlling acceleration, deceleration and stopping. A controller, such as a programmable logic controller, is used for monitoring the position of the turntable top structure through the plurality of sensors, and decides how it operates a motor drive, such as variable frequency drive, of the gearmotor for controlling the acceleration, deceleration and stopping of the turntable.

32 Claims, 8 Drawing Sheets

HIGH PRECISION POSITIONING POWERED TURNTABLE AND CONTROL METHOD THEREOF

FIELD OF THE INVENTION

This application claims priority benefits of Canadian Patent Application Serial Number 2,528,892 filed Dec. 5, 2005.

The invention relates to the field of material handling or logistic equipment, in particular, turntables, which can be used for automation of production line, assembly assistance, linefeeding and synchronous manufacturing.

BACKGROUND OF THE INVENTION

Material handling equipment is used in many different industries, especially in manufacturing fields, including, without limitation, ship building, aerospace or plane building, automotive, heavy equipment, appliances, construction material, furniture, etc. As variety and volume of goods and materials that the equipment handles have been grown drastically in past few decades, needs for automating material handling processes in various industries span out even more demanding requirements on the machineries and equipments, including speed, precision, gentler handling of materials, etc.

Turntables alone have evolved significantly over the past few decades. In most of cases, pneumatic motor driven turntables are most commonly used equipment. This type of turntables is generally supported by air bearings or caster wheels and rotate around a centre hub. Usually, a friction wheel, driven by an air motor, is used to provide power to turn the table. The friction wheel is pressed against the side of the turntable, contacting with a ring, which is welded on the perimeter of the wheel for providing the friction surface. As the air motor is engaged to rotate the friction wheel, the friction wheel, in turn, rotates the turntable. Once the turntable reached to a designated position, a shot pin will be fired to stop and hold the turntable in the desired position.

There are a number of shortcomings with the current pneumatic motor driven turntables. First, they often create sudden movements, i.e. sudden start and sudden stop due to a shot pin fired to stop and hold the position. These sudden movements could cause problems if a material or materials placed on the turntable are sensitive to the shock. These sudden movements also create many constraints of where and how to place or stack materials on the turntable to avoid damages from sudden movements, load shifts, etc. Quite often, some supporting structures on this type of turntables are required to avoid the aforementioned problems; however, this will also add another constraint related to operable and available space. The sudden movement also causes faster pace of wear and tear, mechanical stresses and damages to the shot pins and friction wheel. As the friction wheel wears, it will worsen the driving efficiency of the turntable. Ultimately, it will cause the maintenance cost to rise.

Second, pneumatic motor driven turntables lack positioning accuracy due to the lack of precision in pneumatic motor friction wheel drive. Most of the pneumatic motor driven turntables with friction wheels have a position accuracy of about +/−1 inch or larger. Accuracy is a very crucial factor for automation application, especially for robot loading and picking applications. However, mainly, due to the inefficiency of friction wheel (error from wear and tear of a ring to provide friction surface, slippage, etc) and difficulty to control speed, acceleration and deceleration with the air motor, it is almost impossible to improve the positioning accuracy.

Third, pneumatic turntables are difficult to integrate and interface with an electric control system, since most of the moving parts are pneumatically driven. Solenoid valve may be used to control pressured air for starting and stopping the turntable by an electric control system. However, there is no cost effective solution to control speed for avoiding sudden movements and for improving positioning accuracy.

Forth, due to the physical packaging limitation, pneumatic drive motors are usually placed outside of the turntable frame structure, being exposed to the environment, especially, to dust, dirt or physical damages; therefore, it causes a high maintenance cost due to the exposure. It also becomes a constraint when considering for laying out floor plan, i.e. for a production line.

Fifth, due to the mechanical structure of pneumatically driven turntables and how it is driven through friction wheel, the shape of the turntables are generally limited to round and circle. This limits where and how the table is to be applied. Due to its circular construction, it is expensive to build as well.

Sixth, due to the complexity of and stresses to the mechanical structure and components of the pneumatically driven turntables, maintenance costs are quite high, plus cost for repairing air bearings and drive chain cannot be ignored, since various parts requires air tightness, and any loose parts, cracks, wear and tear would worsen the efficiency and, thus, productivity after all.

Lastly, due to the usage of highly pressured air for driving pneumatic motor, it often produces hazardous noise. It would become a health concern for the operators, and would indirectly cause productivity to be deteriorated.

The objective of the present invention is to address all these shortcomings from the aforementioned commonly used solution, and to provide better position accuracy, more suitable for automation, mechanically simpler, but yet, inexpensive to build and maintain.

SUMMARY OF THE INVENTION

The invention relates to the field of material handling or logistic equipment, in particular, turntables, which can be used for automation of production line, assembly assistance, linefeeding and synchronous manufacturing. A high precision positioning powered turntable and its controlling method are disclosed herewithin, based on slewing ring bearing having an integral gear on the inner ring, and positively driven by a gearmotor. A plurality of sensors and sensor flags are installed for monitoring position of the turntable top structure for controlling acceleration, deceleration and stopping. A controller, such as a programmable logic controller, is used for monitoring the position of the turntable top structure through the plurality of sensors, and decides how it operates a motor drive, such as variable frequency drive, of the gearmotor for controlling the acceleration, deceleration and stopping of the turntable.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this is respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a high precision positioning powered turntable for handling materials.

According to one aspect of the invention, it provides a high precision positioning powered turntable for handling materials comprises: (i) a turntable top structure; (ii) a base frame structure for providing a housing structure for a motor and for providing a fotmdation structure for the turntable top structure; (iii) a slewing ring bearing for rotatably attaching the turntable top structure to the base frame structure; wherein the slewing ring bearing comprises an inner and outer rings slidably attached each other, wherein the inner ring of the slewing ring bearing has an integral gear and a plurality of fastening means for fastening the turntable top structure, and the outer ring of the slewing ring bearing has a plurality of fastening means for fastening the slewing ring onto the base frame structure, wherein the motor has a pinion gear engaging with the gear of the one of the rings of the slewing ring bearing. (iv) a controlling means, comprising: a plurality of sensing means attached around the base frame structure for measuring the position and movement of the turntable top structure; a processing means for computing the position and movement of the turntable top structure, and deciding the next movement of the turntable top structure; a storage means for storing instructions programmed for the processing means; and a motor driving means for driving the motor controlled by the processing means.

According to another aspect of the invention, it provides a method for controlling a precision positioning turntable for handling materials comprising steps of: (i) monitoring the position of a turntable top structure by a plurality of sensing means for controlling acceleration, deceleration and stopping; (ii) computing the position and movement of the turntable top structure by a processing mean; (iii) determining the movement of the turntable top structure by the processing means; (iv) driving a motor mounted in a base frame structure of the precision positioning powered turntable as determined at step (iii) through a motor driving means; wherein, the turntable top structure is rotatably attached to the base frame structure by a slew ring bearing, wherein the slewing ring bearing comprises an inner and outer rings slidably attached each other, wherein one of the rings has an integral gear and a plurality fastening means for fastening the turntable top structure, and the other of the rings has a plurality of fastening means for fastening the slewing ring onto the base frame structure, wherein the motor has a pinion gear engaging with the gear of the one of the rings of the slewing ring bearing.

BRIEF DESCRIPTION OF THE DRAWINGS

The invention will now be described in more detail with reference to the accompanying drawings, in which.

DETAILED DESCRIPTION OF THE INVENTION

Figure 1:
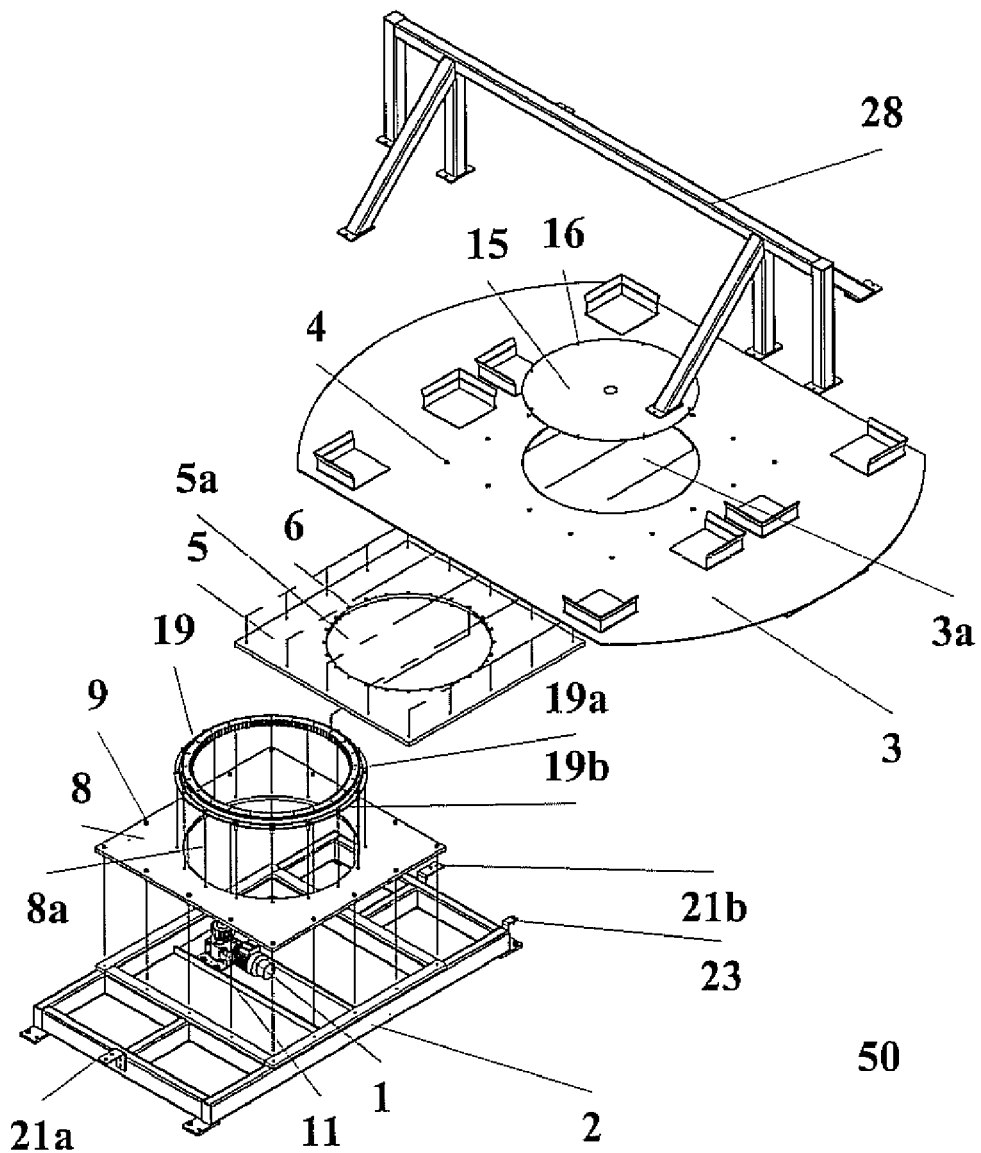
FIG. 1 illustrates a perspective and partially exploded view of a preferred embodiment of the present invention.

FIG. 1 illustrates a perspective and partially exploded view of a preferred embodiment of the present invention. A base frame structure 2 provides a foundation structure of the preferred embodiment of the present invention. It also provides a housing structure for a gearmotor assembly 1, comprising a pinion gear 1a and low profile gearmotor 1b, for providing actuating or driving means for a turntable top structure 3. The gearmotor assembly 1 is securely mounted in the base frame structure 2 by fastening means 11.

A bottom mounting plate 8 is mounted over the gearmotor assembly 1 on the top of the base frame structure 2 by fastening means 9. The outer shape of the bottom mounting plate 8 could be any shape as long as it provides a secure and stable foundation for a slewing ring bearing 19 and the rest of structure mounted on the top of the slewing ring bearing 19. However, for optimal result functionally, structurally, and economically, the shape of the bottom mounting plate 8 is square in the preferred embodiment of the present invention. The slewing ring bearing 19 comprises an inner ring 19a and outer ring 19b slidably attached to each other. The slewing ring bearing 19 further comprises an integral gear on the inner ring 19a. There is a circular cut-out 8a centered at the center of the of the bottom mounting plate 8, sized slightly larger than the inner ring 19a but slightly smaller than the outer ring 19b of the slewing ring bearing 19, so that the outer ring 19b of slewing ring bearing 19 can be mounted on the top and along the edge of the cut-out 8a of the bottom mounting plate 8, and the gear along the inner ring 19a of the slewing ring bearing 19 can be engaged with the pinion gear 1a of the gearmotor assembly 1 through the circular cut-out 8a.

A top mounting plate 5 is mounted on the top of the inner ring 19a of the slewing ring bearing 19 by fastening means 6 for providing secure foundation for a turntable top structure 3. Then the turntable top structure 3 is mounted oil the top of the top mounting plate 5 by fastening means 4. Optionally, the turntable top structure 3 and top mounting plate 5 may also have a circular cut-out 3a on the turntable top structure 3 and circular cut-out 5a on the top mounting plate 5, which are the same in size but are similar to the cut-out 8a of the bottom mounting plate 8. The cut-out 3a and 5a aligns each other so that it will form a through hole from the turntable top structure to the gearmotor assembly 1, when assembled, for a person to access the gearmotor assembly 1 from the top without flipping the whole table upside down. The turntable top structure 3 has a circular cut-out 3a in similar manner as the circular cut-out 5a of the top mounting plate 5 for accessing the gearmotor assembly 1 from the top. Further, the circular cut-out 3a of the turntable top structure 3 can be sealed to provide a flat, continuous surface by attaching a detachable circular member (or top access hatch) 15 by fastening means 16. Optionally, for material handling application, a back stop structure 28 may be installed on the top of turntable top structure 3 by fastening means 16.

It is important to gradually decelerate the turntable top structure 3 prior to a full stop for better handling of materials and for stopping the turntable top structure 3 precisely at designated positions; however, minimizing (or optimizing) the duration or time of deceleration is also important as well for maintaining high productivity and efficiency respect to time. It is equally important to gradually accelerate as well, and optimizing duration of acceleration also impacts productivity and efficiency in the similar way.

The preferred embodiment of the present invention utilizes a plurality of sensors for measuring the position and movement of the turntable top structure 3, a controller 200 (not shown) and a motor drive 202 (not shown) for better positioning precision, and acceleration and deceleration control. More preferably, the plurality of the sensors aforementioned comprises two turntable slowdown sensors 21a and 21b, and a turntable position sensor 23 connected to a controller 200 via a communication means 205a (not shown). These two turntable slowdown sensors 21a and 21b, in conjunction with a turntable slowdown proximity flag 20 (not shown), are for measuring or detecting the position of the turntable top structure 3 approaching to a stop position so that the controller 200 would be able to initiate deceleration of the gearmotor 1b through a motor drive 202 (not shown). The turntable slowdown sensors 21a and 21b are located at the center on each end of the base frame structure 2. The turntable slowdown sensors 21a and 21b are proximity type sensors. In the preferred embodiment of the present invention, inductive proximity sensors are used for this purpose. The turntable slowdown proximity flag 20 is mounted on a side, underneath of the turntable top structure 3, and placed at a such location that the turntable slowdown proximity flag 20 passes through above one of the turntable slowdown sensors 21a and 21b right before the turntable top structure 3 reaches to a stop position.

In the preferred embodiment of the present invention, the turntable position sensor 23, in conjunction with the turntable position flags 24 (not shown), are used for measuring or detecting whether the turntable top structure 3 is in a stop position so that the controller 200 would be able to decide when to stop the gearmotor 1b through the motor drive 202 for bringing the turntable top structure 3 to a full stop. The turntable position sensor 23 is mounted at one corner of the base frame structure 2. The turntable position sensor 23 is also a proximity type sensor. In the preferred embodiment of the present invention, inductive proximity sensor is used for this purpose. Two turntable position flags 24 are mounted on two sides at 180 degrees opposite to each other, underneath the turntable top structure 3. These turntable position flags 24 are placed at such a location so that one of the turntable position flags 24 will be right above the turntable position sensor 23 when the turntable top structure 3 is in a stop position.

Alternatively, the similar functionality as described above can be achieved by having the base frame structure 2 comprising one turntable position sensor 23 and one turntable slowdown sensor 21a or 21b and the turntable top structure 3 comprising two position proximity flags 24 and two slowdown proximity flags 20. It is noted that, in the present invention, it essentially requires at least one position sensor and at least one slowdown sensor on the base frame structure 2, and at least one position flag and at least one slowdown flag on the turntable top structure 3. Depending on the requirement on the movement of the turntable top structure 3 (i.e. number of stops and their angles from the starting position), the number of the sensors (position and slowdown sensors) and the flags (the turntable position and slowdown flags) may vary from what is shown above.

Figure 2:
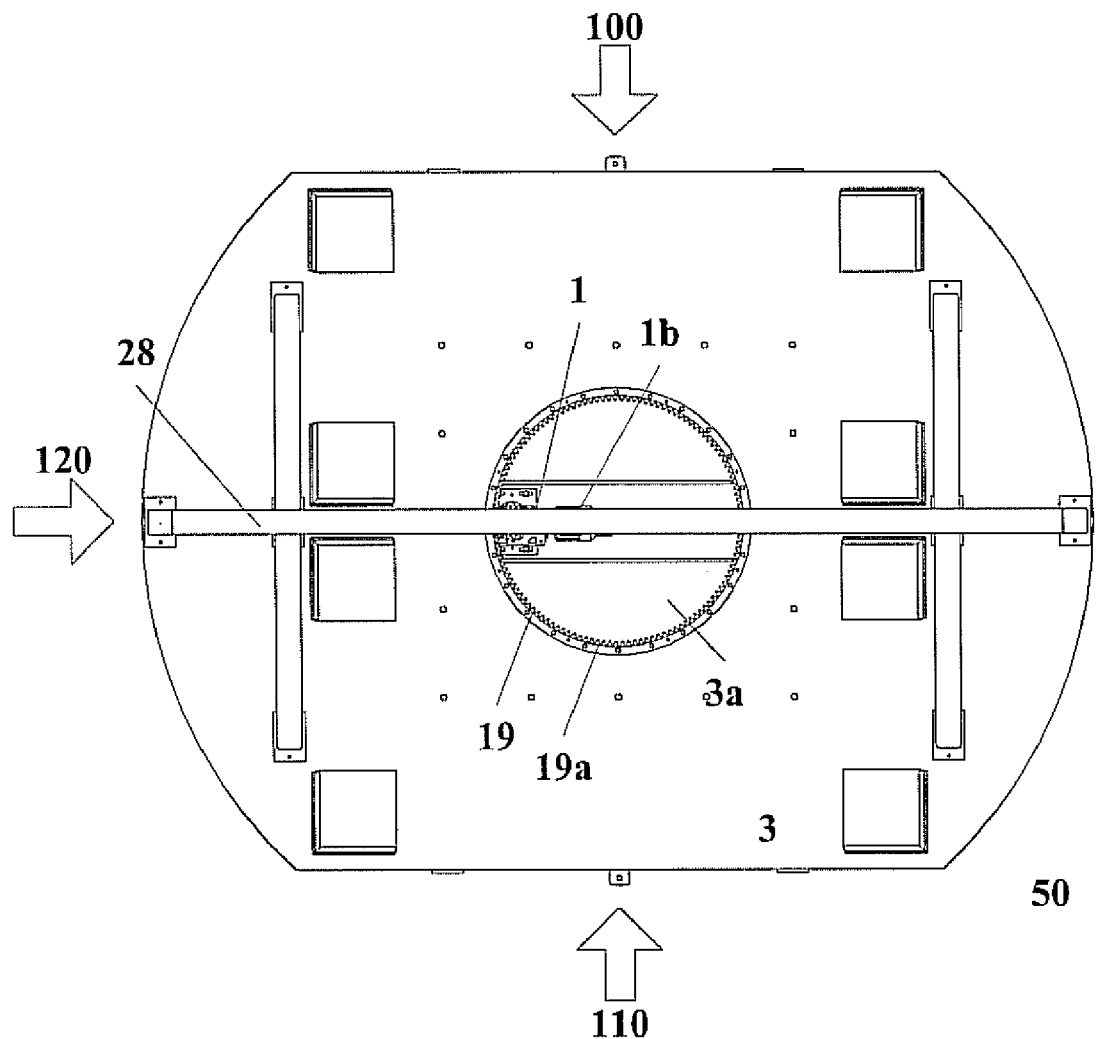
FIG. 2 illustrates a top plan view of the preferred embodiment of the present invention.

FIG. 2 illustrates a top plan view of the preferred embodiment of the present invention. The turntable top structure 3 is in elongated circular or oval shape, having the circular opening 3a at the center. The gearmotor assembly 1 is positioned below the circular opening 3a, integrally engaging its pinion gear 1a to the gear on the inner ring 19a of the slewing ring bearing 19.

Figure 3:
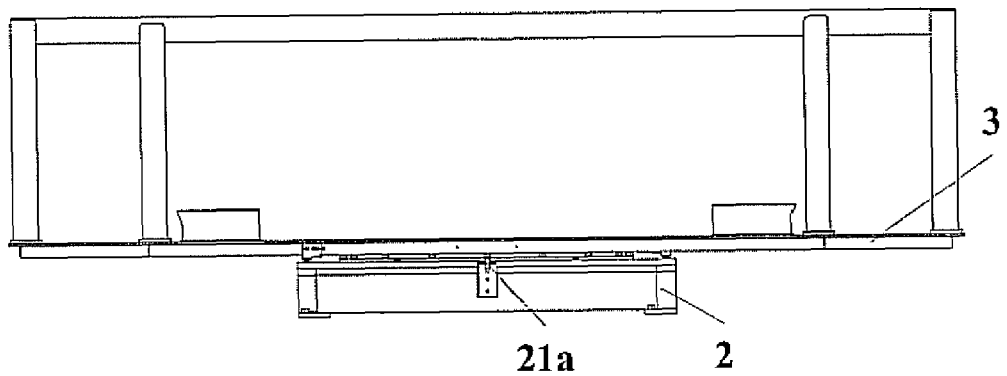
FIG. 3 illustrates a first side view of the preferred embodiment of the present invention, seen in the direction of arrow 100 in FIG. 2.

FIG. 3 illustrates a first side view of the preferred embodiment of the present invention, seen in the direction of arrow 100 in FIG. 2. The slowdown sensor 21a is located at the center of one side of the base frame structure 2, closely located below the bottom surface of the turntable top structure 3.

Figure 3A:
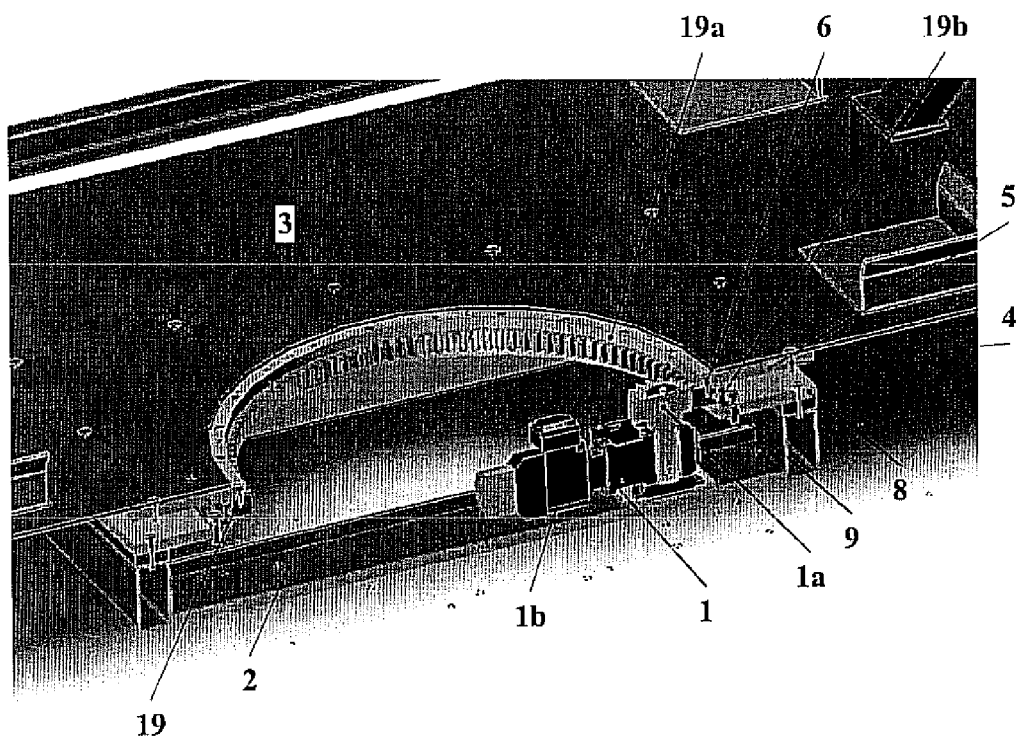
FIG. 3a illustrates a perspective cross-section view of the turntable.

FIG. 3a illustrates a perspective cross-section view of the turntable 50. The gearmotor assembly 1 comprises a low profile gearmotor 1b and a pinion gear 1a. The pinion gear is engaged to the integral gear on the inner ring 19a of the slewing ring bearing 19. The top mounting plate 5 is mounted on the top of the inner ring 19a of the slewing ring bearing 19 by a plurality of fastening means 6, and the outer ring 19b of the slewing ring bearing 19 is mounted on the top of the bottom mounting plate 8 by a plurality of fastening means 12 (not shown), where the bottom mounting plate 8 is further mounted on to the base frame structure 2 by a plurality of fastening means 9. The turntable top structure 3 is mounted on top of the top mounting plate 5 by a plurality of fastening means 4.

Figure 4:
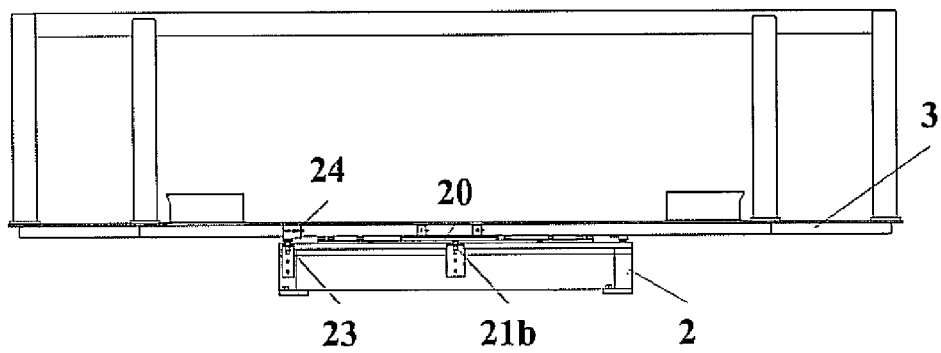
FIG. 4 illustrates a second side view of the preferred embodiment of the present invention, seen in the direction of arrow 110 in FIG. 2.

FIG. 4 illustrates a second side view of the preferred embodiment of the present invention, seen in the direction of arrow 110 in FIG. 2. The turntable slowdown flag 20 is mounted on the side, bottom of the turntable top structure 3, and is situated right above the slowdown sensor 21b, stretching side ways in both directions centering itself at the turntable slowdown sensor 21b. The slowdown sensor 21b is located at the center of the base frame structure 2. At the left corner of the base frame structure 2, the position sensor 23 is mounted right below the bottom surface of the turntable top structure 3, and the turntable position flag 24 is mounted on the side, bottom of the turntable top structure 3.

Figure 4A:
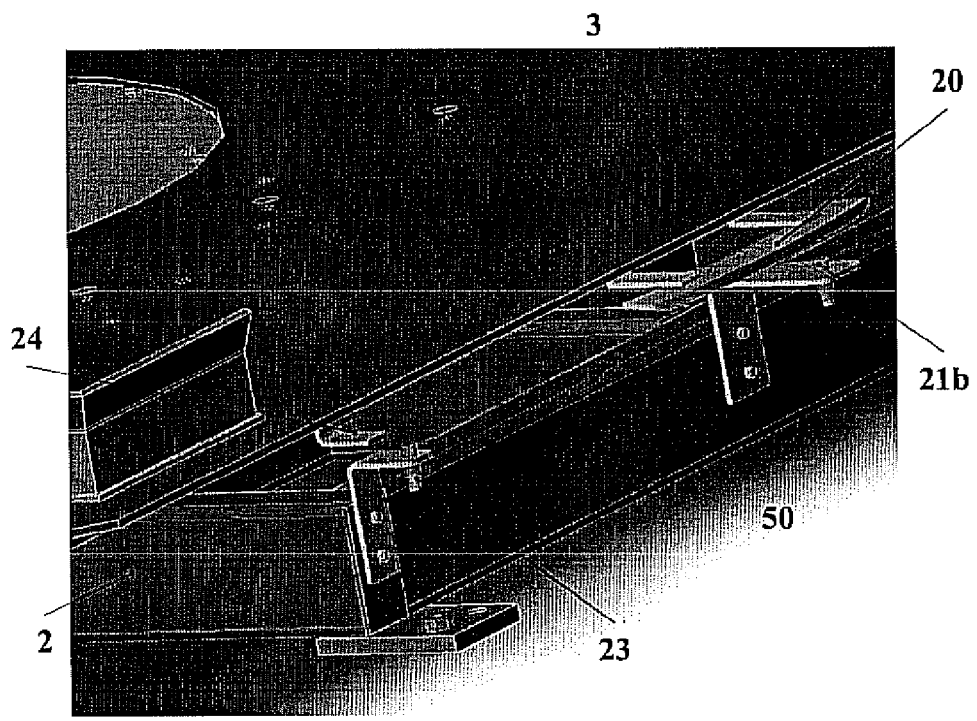
FIG. 4a illustrates a perspective zoomed view of the side of the turntable, detailing the slowdown sensor, the slowdown proximity flag, the position sensor and the position flag while the turntable top structure is in a stop position.

FIG. 4a illustrates a perspective zoomed view of the side of the turntable 50 within the preferred embodiment of the present invention, detailing the slowdown sensor 21b, the slowdown flag 20, the position sensor 23 and the position flag 24 while the turntable top structure 3 is in a stop position. The turntable slowdown flag 20 is shaped like Greek letter, pi or "$\pi$", and the legs of the turntable slowdown flag 20 are attached to and extended outward from the side of the turntable top structure 3. The slowdown proximity flag 20 is elongated and slightly curved in both directions along a circumference of a circle with a radius from the center of the turntable 50 to the slowdown sensor 21a or 21b, so that when the turntable top structure 3 is approaching to a stop position, the slowdown proximity flag passes right above the slowdown sensor 21a or 21b. It is preferred that slowdown sensor 21a and 21b are used for controlling acceleration and deceleration of the gearmotor 1b in conjunction with the slowdown proximity flag 20b, and the position sensor 23 for controlling a stop position in conjunction with the position flags, i.e., the slowdown proximity flag 20 may be arranged in such a way so that the proximity flag 20 is right above the slowdown sensor 21a or 21b while the turntable top structure 3 is in a stop position so that this feature can also be used for gradual or gentle deceleration as well as acceleration of the turntable top structure 3. For example, when the turntable top structure 3 starts to move again, the second half portion of the turntable slowdown flag 20 may be used to keep the speed of the movement low; as soon as the second half of the turntable slowdown flag 20 passes away from above the turntable slowdown sensor 21b (or 21a), then the controller will increase the speed of the movement till the other turntable slowdown sensor 21a (or 21b, respectively) detects the slowdown proximity flag 20. Therefore, it is to be noted that, by adjusting the length of the slowdown proximity flag 20 and position respect to the slowdown sensor 21a or 21b, in conjunction with the timing relationship with the turntable position flag 24 and position sensor 23, the length of the slowdown period (how early it should start to decelerate) and the length of acceleration period can be scaled or adjusted independently.

Figure 5:
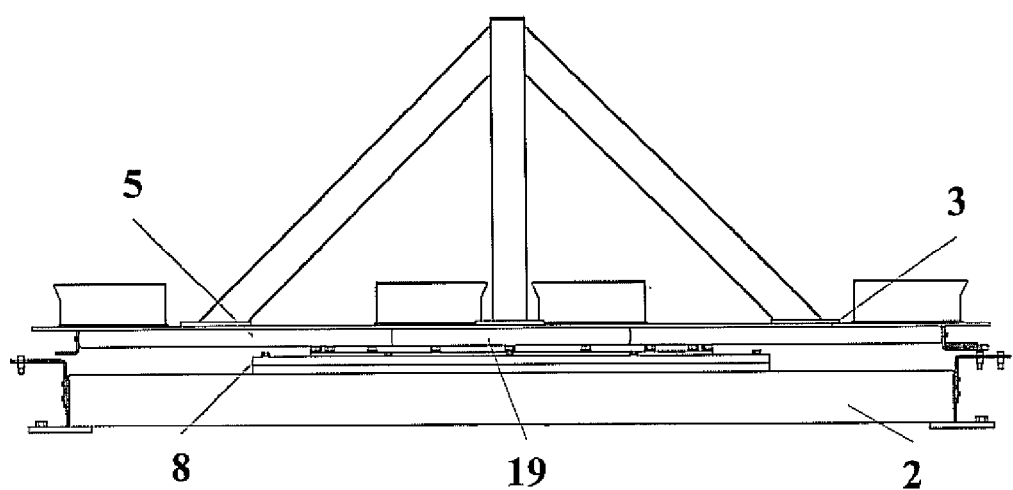
FIG. 5 illustrates a third side view of the preferred embodiment of the present invention, seen in the direction of arrow 120 in FIG. 2.

FIG. 5 illustrates a third side view of the preferred embodiment of the present invention, seen in the direction of arrow 120 in FIG. 2. The slewing ring bearing 19 is attached on the top of the base mounting plate 8, which is mounted on the top of the base frame structure 2. The turntable top structure 3 is mounted on the top of the top mounting plate 5, which is attached on the top of slewing ring bearing 19.

Figure 6:
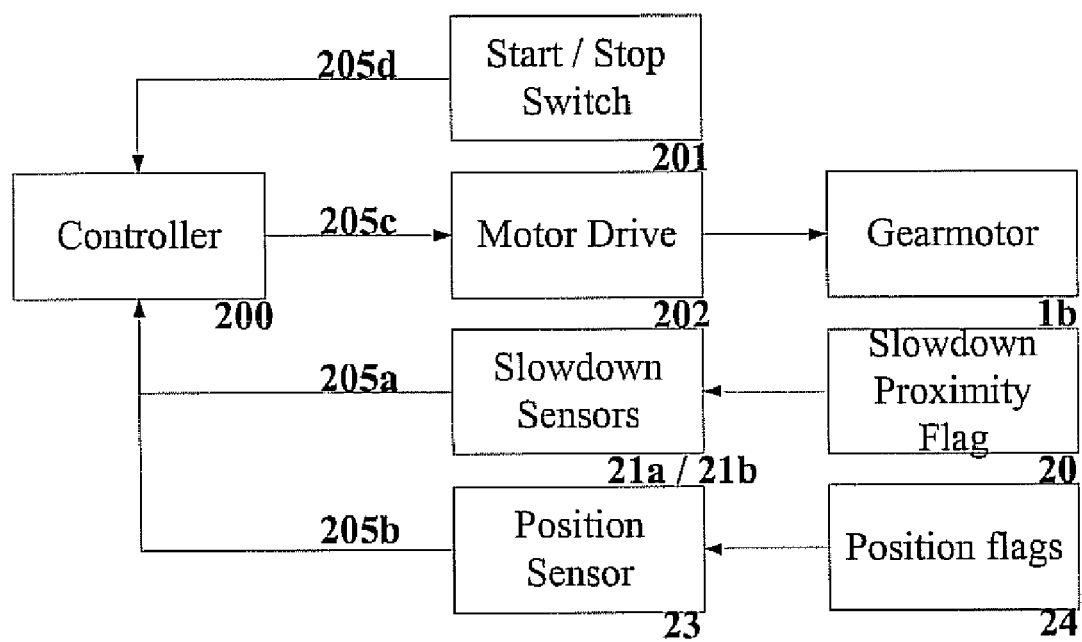
FIG. 6 illustrates a control system overview of the preferred embodiment of the present invention.

FIG. 6 illustrates a control system overview of the preferred embodiment of the present invention. A Start/Stop Switch 201 is connected to the controller 200 for controlling start and stop of the movement of the turntable 50 via a communication means 205d. The Start/Stop Switch 201 may be operated manually by an operator or automatically by another processing means for coordinating and integrating with other computer controlled powered equipment for automation. The controller 200 is collecting information from the slowdown proximity sensors 21a and 21b via a communication means 205a, and the position sensor 23 via a communication means 205b. Based on the measurement or/and detection information collected from these sensors, the controller 200 decides how the gearmotor 1b is to be driven through a motor drive 202 via a communication mean 205c. In a preferred embodiment of the present invention, the motor drive 202 is a variable frequency drive or VFD, and the gearmotor 1b is a motor controllable using the VFD drive. The controller 200 is a processing means, such as hardware logic, personal computer, embedded computing device, etc. In the preferred embodiment of the present invention, the controller 200 is a programmable logic controller or PLC. The communication means 205a, 205b, 205c and 205d may be wired or wireless communication means, including but not limited to a serial wired communication, a parallel wired communication, an infra red, or a communication over a radio. The communication means 205c may further comprise stop-run input (not shown), master enable input (not shown), and speed select input (not shown) for controlling the gearmotor 1b through the motor drive 202. The stop-run input is a control input for indicating start and stop signal to the gearmotor 1b. The master enable input is a control signal for enabling all the operation from the controller 200 to the gearmotor 1b. If there is any emergency situation that requires to shutoff the gearmotor 1b, this input will be used to override and to bypass any other control signals sent over the communication means 205c, and stop the gearmotor 1b immediately. The speed select input is for programming the target speed of the gearmotor 1b. The motor drive 202 incrementally increases (or incrementally decreases, for stopping) the speed of the gearmotor 1b for smoother acceleration (or deceleration). The rates of the acceleration and deceleration are predetermined. In the preferred embodiment of the present invention, the rates of the acceleration and deceleration may be constant (or linear) over the time. Alternatively, the rates may be variable over the time; for example, slower acceleration from the complete stop till gaining the initial momentum. The rates may be optimized to obtain shortest acceleration/deceleration time while maintaining stability of the load on the turntable.

Figure 7:
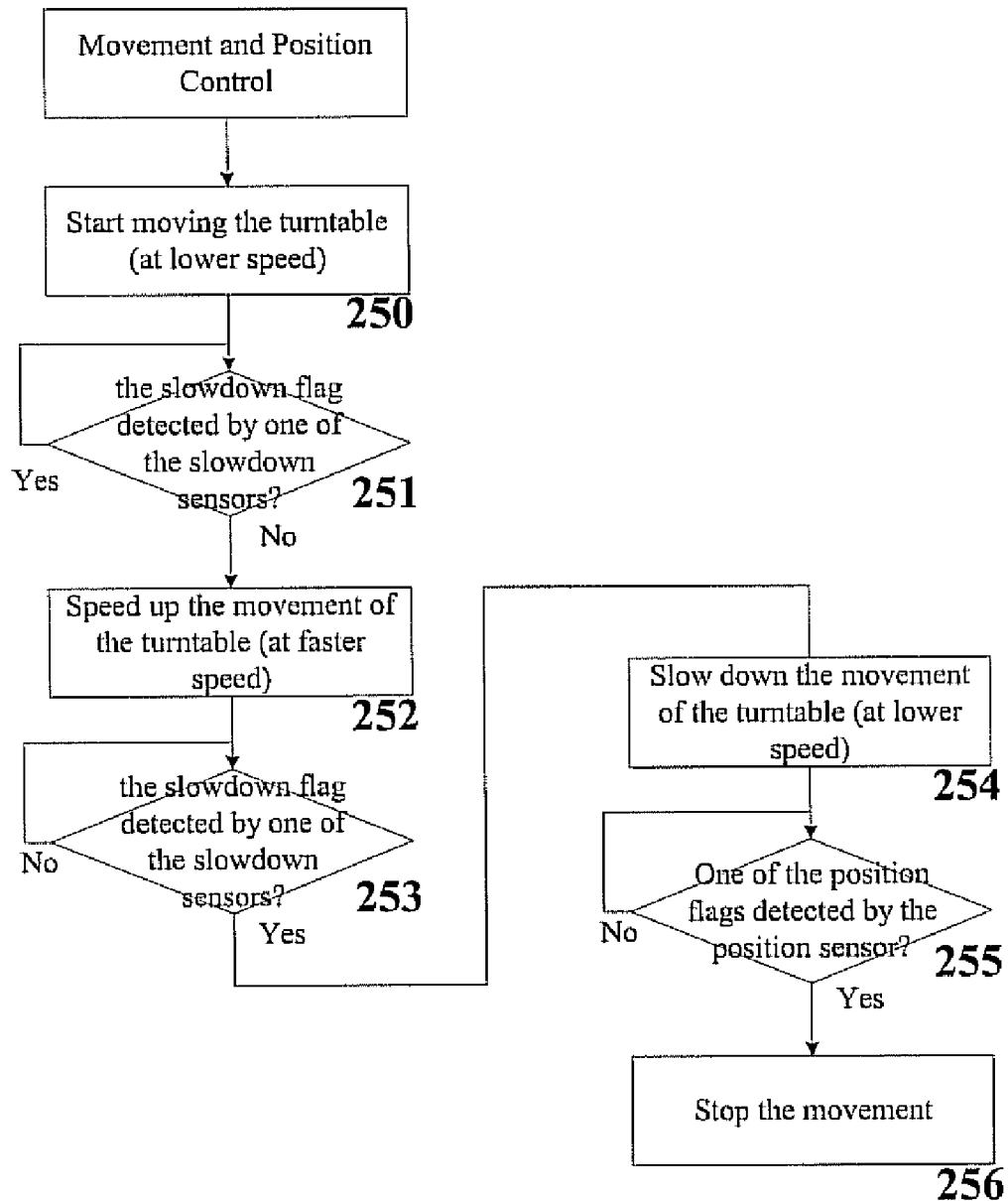
FIG. 7 illustrates a method for controlling movement and position of the turntable.

FIG. 7 illustrates a method for controlling movement and position of the turntable 50. Once start switch 201 (not shown) is pressed, the controller 200 drives the gearmotor 1b through the motor drive 202 at a lower speed, while the second half of the slowdown proximity flag 20 is still above the slowdown sensor 21a or 21b at step 250. The controller monitors the slowdown sensor 21a and/or 21b to see whether it still senses the presence of the slowdown proximity flag 20 being above the slowdown sensor 21a or 21b at step 251. Once the controller detects that slowdown sensors 21a and 21b no longer senses the slowdown proximity flag, then the controller 200 decides to speed up the movement of the turntable top structure 3 at a faster speed predetermined or pre-programmed) at step 252 by incrementally increasing VFD frequency for increasing the speed of the gearmotor 1b. Once it speeded up, then the controller 200 starts to wait for any of the slowdown sensors 21a and 21b to detect the slowdown proximity flag 20 at step 253. Once it is detected, then the controller 200 slows down the movement of the turntable top structure 3 at 254 by incrementally reducing VFD frequency for decreasing the speed of the gearmotor 1b, and then, waits for the position sensor 23 to detect position flag 24. Once it detects position flag 24 at step 255, the controller 200 stops the movement of the turntable top structure 2.

Figure 8:
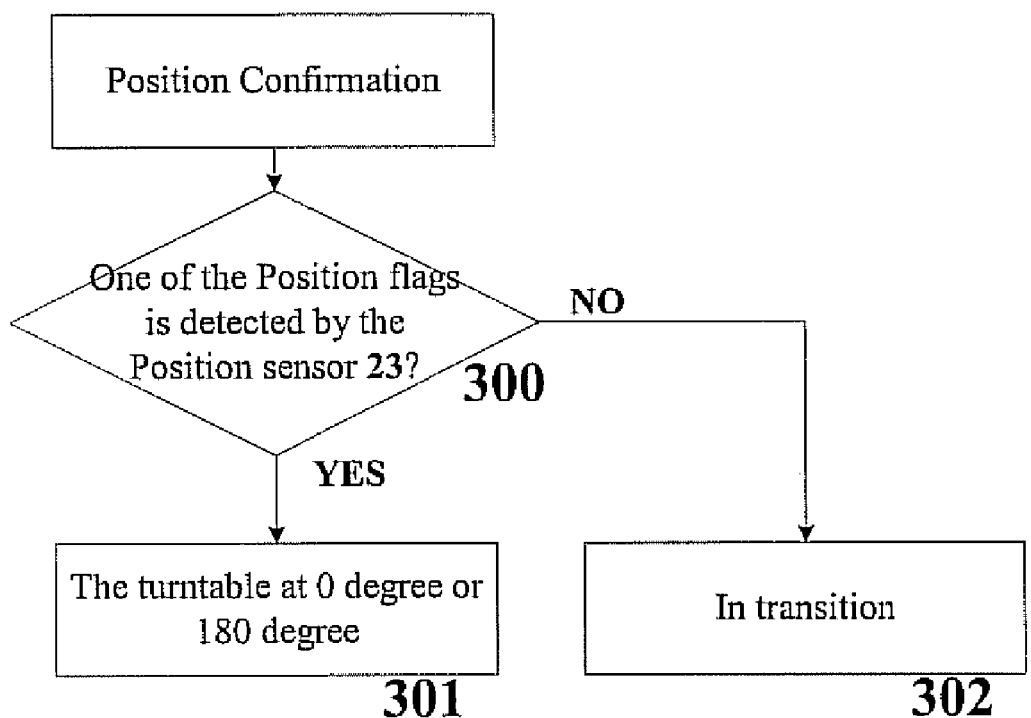
FIG. 8 illustrates a method for confirming the position of the turntable top structure in the preferred embodiment of the present invention.

With the sensor arrangement of the preferred embodiment of the present invention, the position of the turntable top structure 3 can be confirmed. FIG. 8 illustrates a method for confirming the position of the turntable top structure 3 in the preferred embodiment of the present invention. When a user queries the current position of the turntable top structure, the controller checks whether one of the position proximity flags 24 was detected by the turntable position sensor 23 or not at step 300. If the turntable position sensor 23 detected one of the turntable position proximity flags 24, then the turntable top structure is positioned at 0 degree or 180 degree as shown in step 301; otherwise, and since it is not detected by the turntable position sensor 23, the turntable top structure 3 is in transition as shown in step 302.

It is to be understood that the embodiments and variations shown and described herein are merely illustrations of the principles of this invention and that various modifications may be implemented by those skilled in the art without departing from the spirit and scope of the invention.

What is claimed is:

1. A high precision positioning powered turntable for handling materials comprises:
   (i) a turntable top structure;
   (ii) a base frame structure for providing a housing structure for a motor and for providing a foundation structure for said turntable top structure;
   (iii) a slewing ring bearing for rotatably attaching said turntable top structure to said base frame structure;
      wherein said slewing ring bearing comprises an inner and outer rings slidably attached to each other, wherein said inner ring of said slewing ring bearing has an integral gear and a plurality of fastening means for fastening said turntable top structure, and said outer ring of said slewing ring bearing has a plurality of fastening means for fastening said slewing ring onto said base frame structure, wherein said motor has a pinion gear engaging with said gear on said inner ring of said slewing ring bearing;

(iv) a controlling means, comprising:
 a plurality of sensing means attached around said base frame structure for measuring the position and movement of said turntable top structure;
 a processing means for computing the position and movement of said turntable top structure, and deciding the next movement of said turntable top structure;
 a storage means for storing instructions programmed for said processing means; and
 a motor driving means for driving said motor controlled by said processing means.

2. The turntable as recited in claim 1 further comprises a top mounting plate and a bottom mounting plate, wherein said top mounting plate is attached to said inner ring of said slewing ring for said turntable top structure to be mounted on the top of said top mounting plate, and wherein said bottom mounting plate is attached to said base frame structure for said outer ring of said slewing ring bearing to be mounted on the top of said bottom mounting plate.

3. The turntable as recited in claim 1, wherein said turntable top structure further comprises a plurality of sensor flags for said plurality of sensing means to indicate the position of said turntable top structure.

4. The turntable as recited in claim 3, wherein said plurality of sensing means comprise at least one sensor in conjunction with at least one of said plurality of sensor flags for controlling acceleration and deceleration of said motor, and at least one sensor in conjunction with at lease one of said plurality of sensor flags for controlling a stop position.

5. The turntable as recited in claim 4, wherein a duration of acceleration and deceleration are adjusted based on relative location and length of said at least one of said plurality of sensor flags for controlling acceleration and deceleration.

6. The turntable as recited in claim 4, wherein said plurality of sensing means are proximity sensors.

7. The turntable as recited in claim 6, wherein said proximity sensors are inductive proximity sensors.

8. The turntable as recited in claim 3, wherein said plurality of sensing means comprise at least one sensor in conjunction with at least two of said plurality of sensor flags for controlling acceleration and deceleration of said motor, and at least one sensor in conjunction with at lease two of said plurality of sensor flags for controlling a stop position.

9. The turntable as recited in claim 8, wherein a duration of acceleration and deceleration are adjusted based on relative location and length of said at least one of said plurality of sensor flags for controlling acceleration and deceleration.

10. The turntable as recited in claim 8, wherein said plurality of sensing means are proximity sensors.

11. The turntable as recited in claim 10, wherein said proximity sensors are inductive proximity sensors.

12. The turntable as recited in claim 3, wherein said plurality of sensing means comprise at least two sensors in conjunction with at least one of said plurality of sensor flags for controlling acceleration and deceleration of said motor, and at least one sensor in conjunction with at least two of said plurality of sensor flags for controlling a stop position.

13. The turntable as recited in claim 12, wherein a duration of acceleration and deceleration are adjusted based on relative location and length of said at least one of said plurality of sensor flags for controlling acceleration and deceleration.

14. The turntable as recited in claim 12, wherein said plurality of sensing means are proximity sensors.

15. The turntable as recited in claim 14, wherein said proximity sensors are inductive proximity sensors.

16. The turntable as recited in claim 1, wherein said motor driving means is a variable frequency drive.

17. A method for controlling a precision positioning powered turntable for handling materials comprising the steps of:
 (i) monitoring the position of a turntable top structure by a plurality of sensing means for controlling acceleration, deceleration and stopping;
 (ii) computing the position and movement of said turntable top structure by a processing mean;
 (iii) determining the movement of said turntable top structure by said processing means;
 (iv) driving a motor mounted in a base frame structure of said precision positioning powered turntable as determined at step (iii) through a motor driving means;
 wherein, said turntable top structure is rotatably attached to said base frame structure by a slew ring bearing and wherein said slewing ring bearing comprises an inner and outer rings slidably attached to each other, wherein one of said rings has an integral gear and a plurality fastening means for fastening said turntable top structure, and the other of said rings has a plurality of fastening means for fastening said slewing ring onto said base frame structure, wherein said motor has a pinion gear engaging with said gear on said inner ring of said slewing ring bearing.

18. The method as recited in claim 17, wherein said precision positioning powered turntable further comprises a top mounting plate and a bottom mounting plate, wherein said top mounting plate is attached to said inner ring of said slewing ring for said turntable top structure to be mounted on the top of said top mounting plate, and wherein said bottom mounting plate is attached to said base frame structure for said outer ring of said slewing ring bearing to be mounted on the top of said bottom mounting plate.

19. The method as recited in claim 17, wherein said turntable top structure further comprises a plurality of sensor flags for said plurality of sensing means to indicate the position of said turntable top structure.

20. The method as recited in claim 19, wherein said plurality of sensing means comprise at least one sensor in conjunction with at least one of said plurality of sensor flags for controlling deceleration and acceleration, and at least one sensor in conjunction with at lease one of said plurality of sensor flags for controlling a stop position.

21. The method as recited in claim 20, wherein a duration of acceleration and deceleration are adjusted based on relative location and length of said at least one of said plurality of sensor flags for controlling acceleration and deceleration.

22. The method as recited in claim 20, wherein said plurality of sensing means are proximity sensors.

23. The method as recited in claim 22, wherein said proximity sensors are inductive proximity sensors.

24. The method as recited in claim 19, wherein said plurality of sensing means comprise at least one sensor in conjunction with at least two of said plurality of sensor flags for controlling deceleration and acceleration, and at least one sensor in conjunction with at lease two of said plurality of sensor flags for controlling a stop position.

25. The method as recited in claim 24, wherein a duration of acceleration and deceleration are adjusted based on relative location and length of said at least one or said plurality of sensor flags for controlling acceleration and deceleration.

26. The method as recited in claim 24, wherein said plurality of sensing means are proximity sensors.

27. The method as recited in claim 26, wherein said proximity sensors are inductive proximity sensors.

28. The method as recited in claim 19, wherein said plurality of sensing means comprise at least two sensors and acceleration in conjunction with at least one of said plurality of sensor flags for controlling deceleration, and at least one sensor in conjunction with at lease two of said plurality of sensor flags for controlling a stop position.

29. The method as recited in claim 28, wherein a duration of acceleration and deceleration are adjusted based on relative location and length of said at least one of said plurality of sensor flags for controlling acceleration and deceleration.

30. The method as recited in claim 28, wherein said plurality of sensing means are proximity sensors.

31. The method as recited in claim 30, wherein said proximity sensors are inductive proximity sensors.

32. The method as recited in claim 17, wherein said motor driving means is a variable frequency drive.

* * * * *